United States Patent
Chiang (10) Patent No.: US 12,080,042 B2
(45) Date of Patent: Sep. 3, 2024

(54) METHOD FOR RETRIEVING IMAGES FROM DATABASE

(71) Applicant: Taiwan Semiconductor Manufacturing Company, Ltd., Hsinchu (TW)

(72) Inventor: Katherine Chiang, New Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 348 days.

(21) Appl. No.: 17/377,609

(22) Filed: Jul. 16, 2021

(65) Prior Publication Data

US 2023/0022057 A1 Jan. 26, 2023

(51) Int. Cl.
  *G06F 16/50* (2019.01)
  *G06F 16/532* (2019.01)
  *G06F 17/16* (2006.01)
  *G06V 10/44* (2022.01)

(52) U.S. Cl.
  CPC ............ *G06V 10/44* (2022.01); *G06F 16/532* (2019.01); *G06F 17/16* (2013.01)

(58) Field of Classification Search
  CPC .................................................. G06F 16/532
  See application file for complete search history.

(56) References Cited

U.S. PATENT DOCUMENTS

| | | | | |
|---|---|---|---|---|
| 2010/0310150 A1* | 12/2010 | Hayashi | ............. | G01N 21/9501 382/145 |
| 2015/0161485 A1* | 6/2015 | Chechik | ................ | G06F 16/583 382/159 |
| 2016/0284089 A1* | 9/2016 | Gulaka | ...................... | G06T 7/33 |
| 2017/0323223 A1* | 11/2017 | Nagata | .................. | G06T 3/4053 |
| 2017/0352145 A1* | 12/2017 | Dhagat | ................ | G02B 21/002 |
| 2018/0019166 A1* | 1/2018 | Cheng | .................. | G06V 10/143 |
| 2018/0089534 A1* | 3/2018 | Ye | ......................... | G06V 40/173 |
| 2018/0266968 A1* | 9/2018 | Hirai | ....................... | G06T 7/001 |
| 2018/0285386 A1* | 10/2018 | Liu | ....................... | G06V 30/413 |
| 2018/0366357 A1* | 12/2018 | Liao | ....................... | G06T 7/0008 |
| 2019/0188840 A1* | 6/2019 | Kwon | .................. | G06V 10/764 |
| 2019/0279840 A1* | 9/2019 | Teo | ..................... | G01N 23/2251 |
| 2019/0318502 A1* | 10/2019 | He | ............................ | G06T 7/74 |
| 2019/0318948 A1* | 10/2019 | Che | .................. | H01L 21/67748 |
| 2020/0026819 A1* | 1/2020 | Leu | ....................... | G06F 30/398 |
| 2020/0279126 A1* | 9/2020 | Nie | ..................... | G01N 15/1475 |
| 2020/0334446 A1* | 10/2020 | Fang | .................... | G06V 20/698 |
| 2020/0380675 A1* | 12/2020 | Golden | .................... | G06T 7/143 |
| 2021/0082089 A1* | 3/2021 | Takada | .................... | G06T 5/002 |
| 2021/0118536 A1* | 4/2021 | Katouzian | .............. | G16H 30/20 |
| 2021/0158495 A1* | 5/2021 | Barnes | ................... | G06V 10/82 |
| 2021/0334608 A1* | 10/2021 | Honda | .................. | G06V 10/764 |
| 2023/0017280 A1* | 1/2023 | Li | ............................. | G06N 7/01 |

\* cited by examiner

*Primary Examiner* — Mohammad S Rostami (74) *Attorney, Agent, or Firm* — McClure, Qualey & Rodack, LLP (57) ABSTRACT

Methods for retrieving images from a database are provided. A query image is obtained. A plurality of patches are extracted from the query image. A set of weightings is obtained according to a plurality of bases of a sparsity-based dictionary. The set of weightings includes a plurality of non-zero weightings. The patches are encoded with the set of weightings to obtain an encoding matrix. The database is searched based on the encoding matrix to retrieve the images corresponding to the query image. The database and the dictionary are dynamically updated to adapt to the query image encountered.

20 Claims, 8 Drawing Sheets

METHOD FOR RETRIEVING IMAGES FROM DATABASE

BACKGROUND

In semiconductor technology, the wafers, each having multiple dies, are produced by a plurality of processes and stages in a wafer fabrication facility (FAB). Each process or stage may introduce one or more defects into the semiconductor wafer, which leads to quality and reliability issues, failures, and yield losses. To improve manufacturing technology and enhance wafer quality, reliability, and yield, the semiconductor wafers are measured, tested, monitored, and diagnosed at each process and at each stage.

BRIEF DESCRIPTION OF THE DRAWINGS

Aspects of the present disclosure are best understood from the following detailed description when read with the accompanying figures. It should be noted that, in accordance with the standard practice in the industry, various nodes are not drawn to scale. In fact, the dimensions of the various nodes may be arbitrarily increased or reduced for clarity of discussion.

DETAILED DESCRIPTION

The following disclosure provides many different embodiments, or examples, for implementing different nodes of the subject matter provided. Specific examples of components and arrangements are described below to simplify the present disclosure. These are, of course, merely examples and are not intended to be limiting. In some embodiments, the formation of a first node over or on a second node in the description that follows may include embodiments in which the first and the second nodes are formed in direct contact, and may also include embodiments in which additional nodes may be formed between the first and the second nodes, such that the first and the second nodes may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

In integrated circuit (IC) design, a variety of functions are integrated into one chip, and an application specific integrated circuit (ASIC) or system on a chip (SOC) cell based design is often used. In this approach, a library of known functions is provided, and after the functional design of the device is specified by choosing and connecting these standard functions, and proper operation of the resulting circuit is verified using electronic design automation (EDA) tools, the library elements are mapped on to predefined layout cells, which contain prefigured elements such as transistors. The cells are chosen with the particular semiconductor process features and parameters in mind to create a process parameterized physical representation of the design. The design flow continues from that point by performing placement and routing of the local and global connections needed to form the completed design using the standard cells.

After design rule checks, design rule verification, timing analysis, critical path analysis, static and dynamic power analysis, and final modifications to the design, a tape-out process is performed to produce photomask generation data. This photomask generation (PG) data is then used to create the optical masks used to fabricate the semiconductor device in a photolithographic process at a wafer fabrication facility (FAB). In the tape-out process, the database file of the IC is converted into a Graphic Database System (GDS) file (e.g. a GDS file or a GDSII file). The GDS file is then used to make various layers of masks for integrated circuit manufacturing. Specifically, the GDS file became the industry's standard format for transfer of IC layout data between design tools of different vendors.

Inspection processes are used in various steps of the semiconductor manufacturing process to detect defects on wafers according to GDS files or images, so as to promote higher yield in the manufacturing process and thus higher profits. Furthermore, as the dimensions of semiconductor devices decrease, inspection becomes even more important to the successful manufacture of acceptable semiconductor devices because smaller defects can cause the devices to fail. For instance, as the dimensions of semiconductor devices decrease, the detection of smaller defects has become necessary since even relatively small defects may cause aberrations in the semiconductor devices. Moreover, as design rules shrink, semiconductor manufacturing processes may be operating closer to the limitations on the performance capability of the processes, and smaller defects can have an impact on the electrical parameters of the device.

Figure 1:
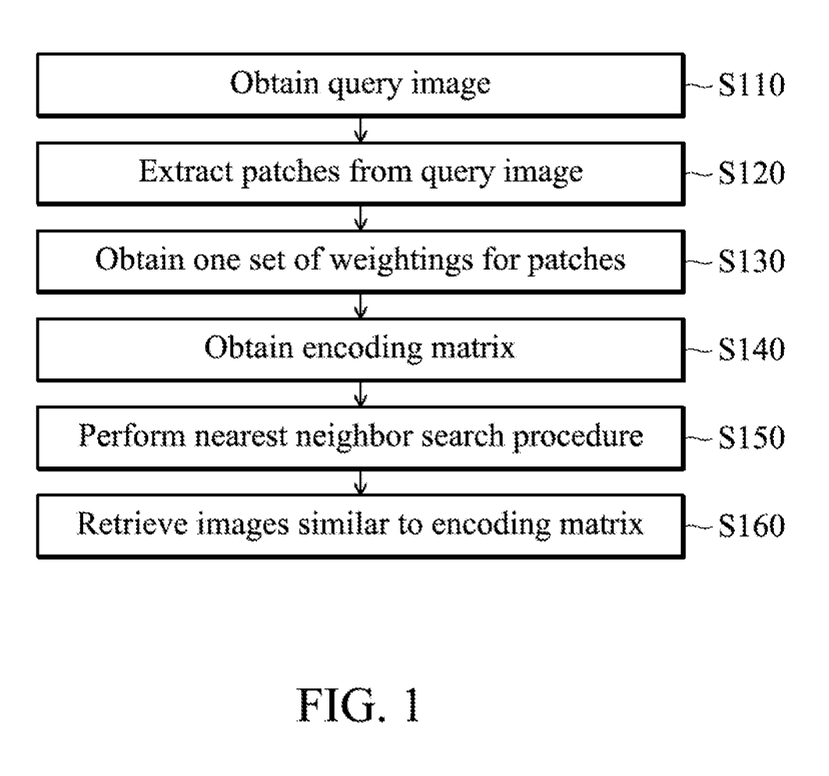
FIG. 1 shows a method for retrieving images from an indexed database based on a query image, in accordance with some embodiments of the disclosure.

FIG. 1 shows a method for retrieving images from an indexed database based on a query image, in accordance with some embodiments of the disclosure. The retrieved images have features similar to the query image.

In operation S110, a query image is obtained. In some embodiments, the retrieved images from the indexed database are used to analyze the query image obtained from a semiconductor wafer to be inspected. In some embodiments, each retrieved image includes at least one pattern feature of the semiconductor wafer. The semiconductor wafer includes multiple dies. The dies are identical and separated from each other by the scribe lines. During various processes, the semiconductor wafer is inspected to detect defects on the dies. In some embodiments, the defects are related to insufficient space and/or line width margins. For example, a critical dimension of the semiconductor wafer, a width or a length of a first feature (e.g. the width/length of conductive line), or a distance between the first feature and a second feature (e.g. the space between two conductive lines, or active area). If an inspection result is normal, the subsequent process or stage is performed on the semiconductor wafer. If the semiconductor wafer has not been completed, the next process is performed on the semiconductor wafer. Similarly, after performing the next process, the semiconductor wafer will be inspected again until all the processes of the semiconductor wafer have been completed. If the semiconductor wafer has been completed, the semiconductor wafer is diced along the scribe lines, and the dies are obtained. Next, multiple integrated circuits (ICs) are fabricated based on the obtained dies.

In some embodiments, the query image is obtained from one or more image capturers for various applications. The retrieved images are used to analyze the query image including multiple objects or features to be identified. For example, the query image includes multiple faces, and the retrieved images corresponding to the query image are used for face recognition. In some embodiments, the query image is a raw image.

In operation S120, multiple patches are extracted from the query image. In some embodiments, the query image is divided into multiple row vectors, and each row vector is assigned as the individual patch. In some embodiments, the number of patches (or the row vectors) is determined according to various applications. In some embodiments, the number of patches (or the row vectors) is determined according to resolution of the query image. In some embodiments, before extracting the patches, the query image is pre-processed so as to adjust brightness and contrast or decrease noise in the query image.

In operation S130, a set of weightings is obtained for the patches according to the bases of a sparsity-based dictionary in a competitive feature exclusion (COMPFEX) procedure. The set of weightings includes some non-zero weightings. In some embodiments, each non-zero weighting within the set of weightings has a weighting value of 1. In some embodiments, the non-zero weightings are arranged such that the non-zero weightings within the set of weightings are normalized to a length of 1. The set of weightings, the basis of the sparsity-based dictionary, and the COMPFEX procedure will be explained later.

In operation S140, an encoding matrix corresponding the query image is obtained according the patches and the set of weightings. In some embodiments, a hebbian strengthening (HEBS) procedure is performed as applying the competitive feature exclusion procedure on multiple sets of patches repeatedly, so as to amplify most-relevant bases/features in the query image(s). In some embodiments, the sets of patches are obtained from the same query image. In some embodiments, the sets of patches are obtained from the different but related query images. The encoding matrix, and the HEBS procedure will be explained later.

In operation S150, the encoding matrix is used to perform a nearest neighbor search procedure on the indexed database. In some embodiments, the nearest neighbor search procedure is performed by comparing the encoding matrix with the matrices pre-stored in the indexed database.

In operation S160, the images corresponding to the pre-stored matrix similar to the encoding matrix are retrieved from the indexed database in response to the search result in the nearest neighbor search procedure. The retrieved images have features similar to the query image. According to the retrieved images, classification or inspection is completed for the unknown query image. Each of the above operations will be illustrated in more detail below.

Figure 2:
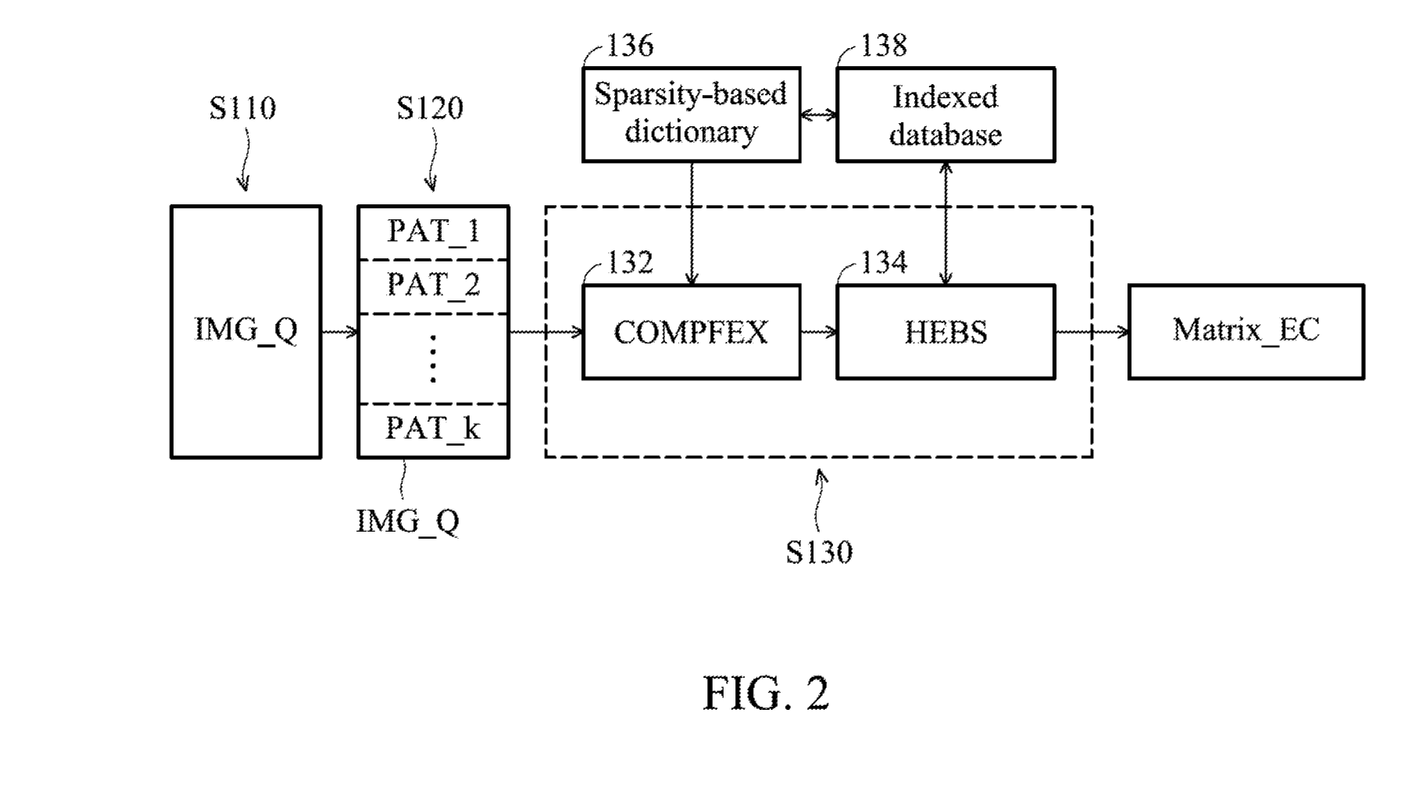
FIG. 2 shows a flowchart of the operations S110-S130 of FIG. 1, in accordance with some embodiments of the disclosure.

FIG. 2 shows a flowchart of the operations S110-S130 of FIG. 1, in accordance with some embodiments of the disclosure. The query image IMG_Q is obtained in operation S110 of FIG. 1. In some embodiments, the query image IMG_Q is a raw image. Next, the query image IMG_Q is divided into multiple patches PAT_1 through PAT_k in operation S120, and each of the patches PAT_1 through PAT_k can be regarded as a row vector. In some embodiments, the patches PAT_1 through PAT_k have the same size, i.e., the patches PAT_1 through PAT_k have the same number of pixels. In some embodiments, the number of patches PAT_1 through PAT_k is determined according to various applications. In some embodiments, the number of patches PAT_1 through PAT_k is determined according to the resolution of pixels per inch (PPI) of the query image IMG_Q.

In the operation S130, the competitive feature exclusion (COMPFEX) procedure 132 and the hebbian strengthening (HEBS) procedure 134 are performed. In the COMPFEX procedure 132, the sparse coding is performed on the patches PAT_1 through PAT_k of the query image IMG_Q according to the bases from the sparsity-based dictionary 136. In the HEBS procedure 134, multiple COMPFEX procedures 132 are performed on multiple sets of patches (stored in the indexed database 138 or from various query images IMG_Q) repeatedly according to the projection position obtained in the previous COMPFEX procedure 132, so as to amplify most-used bases/features in the query image IMG_Q. In some embodiments, the HEBS procedure 134 is omitted. Furthermore, after the COMPFEX procedure is completed, a set of weightings is obtained for the patches PAT_1 through PAT_k of the query image IMG_Q.

Next, an encoding procedure is performed on the patches PAT_1 through PAT_k according to the set of weightings, so as to obtain an encoding matrix Matrix_EC corresponding the query image IMG_Q.

Sparse coding is a type of unsupervised feature learning. Sparse coding finds maximally repeating patterns in data, and this may be achieved with little, limited, or no human intervention. These patterns can then be used to represent the original data (this process is called sparse auto-encoding). Sparse coding can be thought of as a building block for more complex machine learning algorithms. For example, it can be naturally used to learn hierarchies of features at multiple scales in data, i.e., an example of a deep learning architecture.

Sparse coding is a family of related approaches whose objective is to discover ways to represent data concisely. Sparse coding can be used to discover, in an unsupervised setting, special patterns in data that are particularly meaningful. Sparse coding can also be used to find ways to represent, or encode, data in a compressed way. Sparse coding can be naturally used to learn hierarchies of features at multiple scales in data.

The term "sparse" represents that ideally only a few of the parts are required to form one image. The set of these parts that is discovered by sparse coding are often referred to as a dictionary and the parts are called basis (or bases).

Sparse coding algorithms may be run on a conventional computer (i.e., a digital computer), either locally or on a cloud computing system or using a quantum processor. Sparse coding algorithms may be run on any combination of a conventional and/or a quantum processor.

Sparse coding may be applied to many different types of data. In the embodiments, sparse coding is used on image data for explanatory purposes, although several other data types (in particular audio and video) may be utilized as well.

Figure 3:
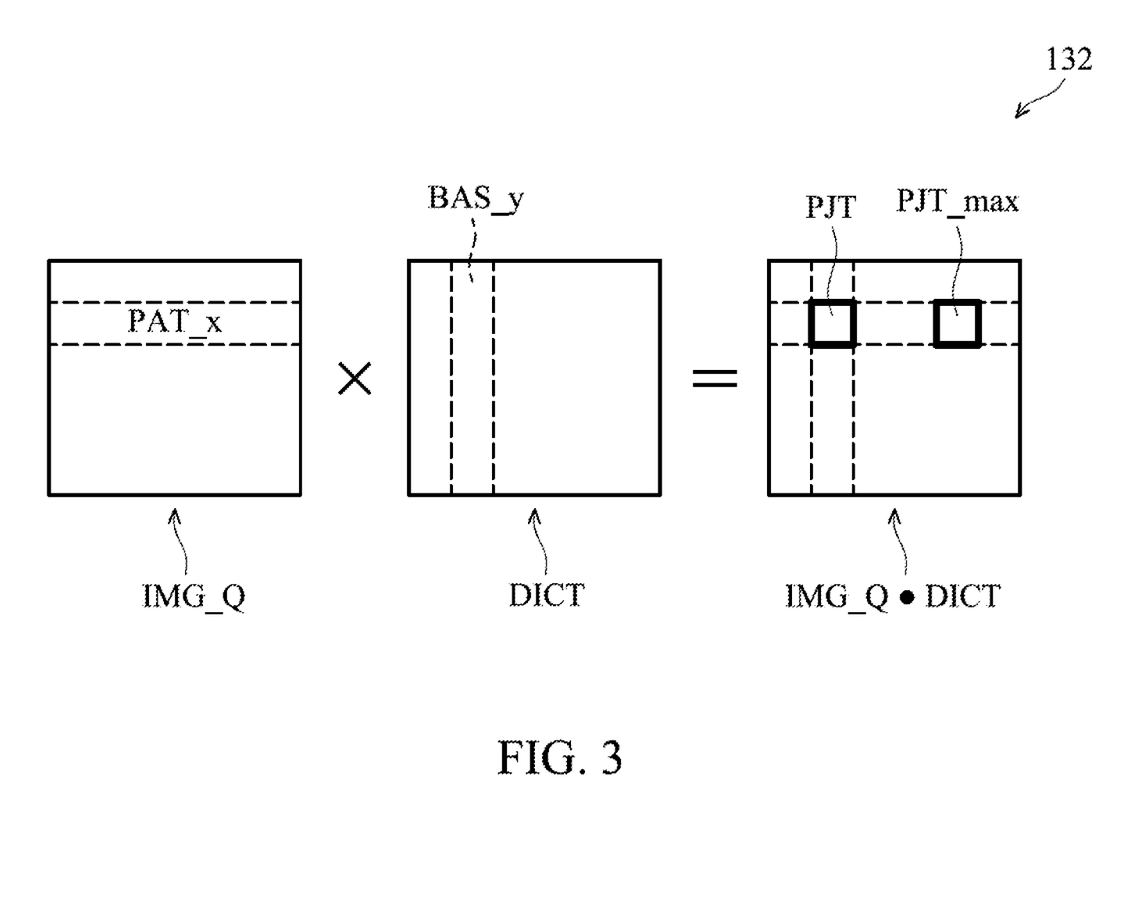
FIG. 3 shows a schematic illustrating competitive feature exclusion (COMPFEX) procedure, in accordance with some embodiments of the disclosure.

Referring to FIG. 3, FIG. 3 shows a schematic illustrating the COMPFEX procedure 132, in accordance with some embodiments of the disclosure. In FIG. 3, data of the patch PAT_x in the query image IMG_Q is multiplied by the basis BAS_y of the dictionary DICT to calculate a plurality of projection values to obtain the projection PJT at a first position where the patch PAT_x and the basis BAS_y cross and to obtain the projection PJT_max at a second position where has the maximum value in the row corresponding to the patch PAT_x. The second position signifies the most "representative" basis for the patch PAT_x, and the maximum value is the projection of the patch PAT_x on the basis other than the basis BAS_y. In other words, each basis from the dictionary DICT (i.e., the sparsity-based dictionary 136) can be regarded as a column vector corresponding to an individual column of the query image IMG_Q.

In some embodiments, the projection of the query image IMG_Q is obtained according to the following software language:

```
Projection ← Data · Dictionary ;
for i = 1; i < τ; i + +do
    for all j, 1 < j < k do
        value_max^(j) ← max( j^th row of Projection )
        index_max^(j) ← position(max( j^th row of Projection ))
        (p_j = j^th row of Data)
        P_j ← P_j − value_max^j · (basis at index_max^j)^T ;
    end for
    Projection = Data · Dictionary
end for,
``` where $\tau$ represents the number of base to be selected, k represents the number of patches PAT_1 through PAT_k. Furthermore, "Data" represents the patch data/value, and "Dictionary" represents the basis data/value. In such embodiments, each patch is a row vector, and each basis is a column vector. Moreover, "Data" and "Dictionary" are obtained according to the following formulas:

$$\text{Data} \in R^{k \times m}$$

$$\text{Dictionary} \in R^{m \times n}$$

wherein "m" represents dimension of the patches and basis, and "n" represents the number of basis in the dictionary DICT (i.e., the sparsity-based dictionary 136).

In some embodiments, due to the nature of sparse coding, the bases in the dictionary DICT are not necessarily mutually independent. In order to enable efficient encoding without redundancy, each "basis/feature" is selected to obtain the projection after the contributions from "already selected" bases/features are excluded.

Figure 4:
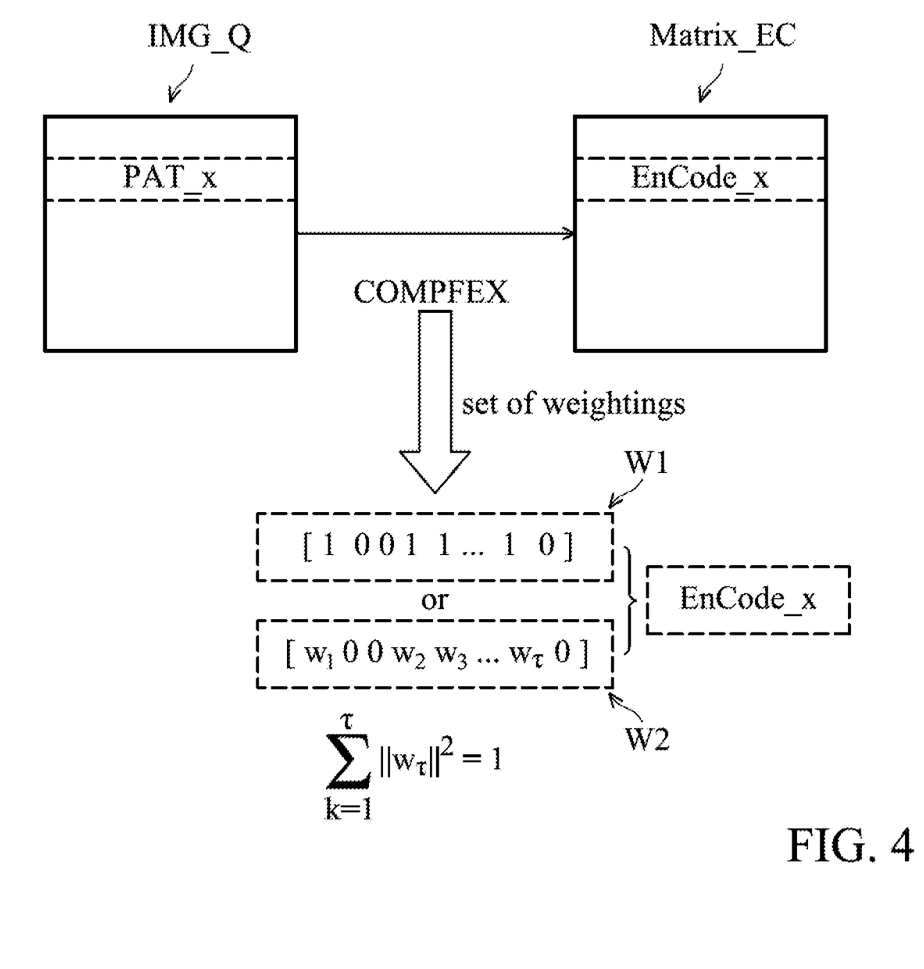
FIG. 4 shows a schematic illustrating the relationship between the encoding matrix Matrix_EC and the query image IMG_Q, in accordance with some embodiments of the disclosure.

Referring to FIG. 4, FIG. 4 shows a schematic illustrating the relationship between the encoding matrix Matrix_EC and the query image IMG_Q, in accordance with some embodiments of the disclosure. In FIG. 4, two encoding schemes are used to providing a first set of weightings W1 and a second set of weightings W2, respectively. In some embodiments, the first set of weightings W1 and the second set of weightings W2 are determined according to the positions corresponding to the $\tau$ selected bases. As described above, the $\tau$ bases are selected in the COMPFEX procedure 132. Next, according to the first set of weightings W1 or the second set of weightings W2, the patch PAT_x of the query image IMG_Q is encoded to obtain an encoded row EnCode_x of the encoding matrix Matrix_EC.

For the first set of weightings W1, each position corresponding to the selected basis is assigned a weighting of one, and each remaining position is assigned a weighting of zero, such as W1=[1,0,0,1,1 . . . , 1,0]. In some embodiments, each patch of the query image IMG_Q is encoded by individual first set of weightings W1 or partially similar first set of weightings W1. In some embodiments, all patches of the query image IMG_Q are encoded by the same first set of weightings W1. In some embodiments, the encoded row EnCode_x is obtained by multiplying the value in each position corresponding to the selected basis by the weighting of one, and by multiplying each value in remaining position by the weighting of zero.

For the second set of weightings W2, each position corresponding to the selected basis is assigned the corresponding projected value as calculated in the COMPFEX procedure 132, and each remaining position is assigned a weighting of zero, such as W2=[$w_1$,0,0,$w_2$,$w_3$ . . . , $w_\tau$,0]. It is noted that the non-zero weightings $w_1$-$w_\tau$ are normalized to a length of 1. In other words, each of the non-zero weightings $w_1$-$w_\tau$ is less than 1, i.e., $w_1$<1, $w_2$<1, $w_3$<1 and so on. In some embodiments, each patch of the query image IMG_Q is encoded by individual second set of weightings W2 or partially similar second set of weightings W2. In some embodiments, all patches of the query image IMG_Q are encoded by the same second set of weightings W2. In some embodiments, the encoded row EnCode_x is obtained by multiplying the value in each position corresponding to the projection PJT_max of the patch PAT_x by the corresponding weighting, and by multiplying each value in remaining position by the weighting of zero.

Figure 5:
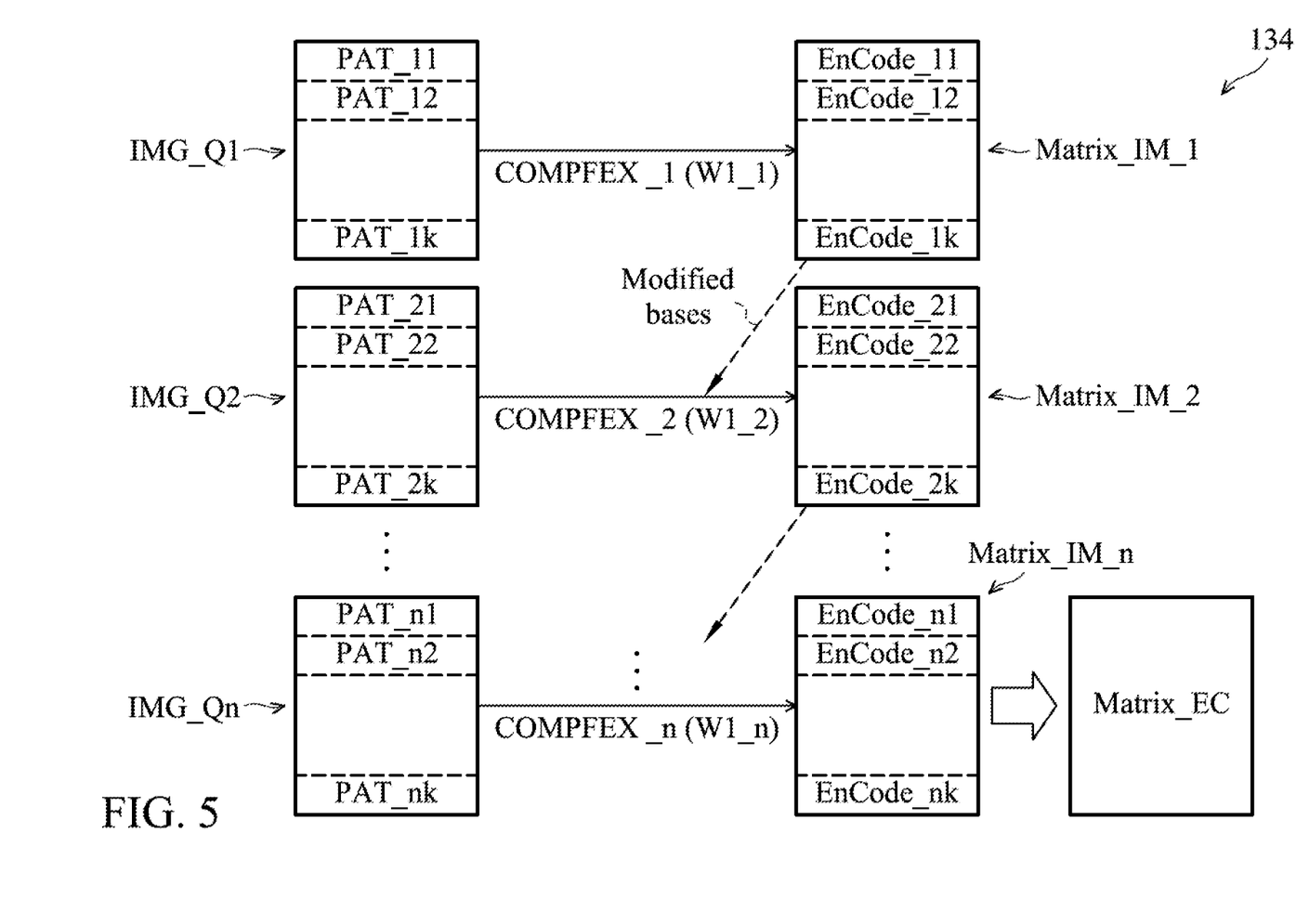
FIG. 5 shows a schematic illustrating the relationship between the encoding matrix Matrix_EC and the query images IMG_Q1 through IMG_Qn in hebbian strengthening (HEBS) procedure, in accordance with some embodiments of the disclosure.

Referring to FIG. 5, FIG. 5 shows a schematic illustrating the relationship between the encoding matrix Matrix_EC and the query images IMG_Q1 through IMG_Qn in the HEBS procedure 134, in accordance with some embodiments of the disclosure. In such embodiments, the HEBS procedure 134 is used to performed multiple COMPFEX procedures COMPFEX_1 through COMPFEX_n on the query images IMG_Q1 through IMG_Qn, respectively, so as to amplify most-used bases/features in the query images IMG_Q1 through IMG_Qn. Furthermore, the HEBS procedure in FIG. 5 continuously updates the bases adaptive to the query images IMG_Q1 through IMG_Qn, thus enabling a dynamic dictionary (i.e., the sparsity-based dictionary 136). It should be noted each of the encoding matrixs Matrix_IM_0 through Matrix_IM_n of the corresponding queries IMG_Q1 through IMG_Qn thus carries the learnings for bases fine-tuning from all queries before (i.e. IMG_Q1 to IMG_Qn). For example, the encoding matrix Matrix_IM_5 of the query IMG_Q5 carries the learnings for bases fine-tuning from the queries IMG_Q0 through IMG_Q4.

In some embodiments, the query images IMG_Q1 through IMG_Qn are obtained from different images of the similar categories. Furthermore, each of the matrixes Matrix_IM_1 through Matrix_IM_n is an encoding matrix Matrix_EC for the corresponding query image. For example, the encoded rows EnCode_21 through EnCode_2k of the encoding matrix Matrix_IM_2 are obtained by encoding the patches PAT_21 through PAT_2k of the query image IMG_Q2 according to the first set of weightings W1_2.

Moreover, the query images IMG_Q1 and IMG_Q2 are the different patch sets generated from the different images.

In the embodiments of FIG. 5, the query images IMG_Q1 through IMG_Qn are the different patch sets generated from the same IMG_Q. While only the encoding matrix Matrix_EC in final step is used for image retrieval, the HEBS procedure in FIG. 5 can remove patch-set-bias that distort image retrieval quality.

As described above, two encoding schemes can be used to providing the first set of weightings W1 and the second set of weightings W2, respectively. In FIG. 5, assuming the first set of weightings W1 is used in the HEBS procedure 134 for illustration. Similarly, the τ bases are selected in the COMPFEX procedure COMPFEX_1, and a first set of weightings W1_1 is obtained. Next, according to the first set of weightings W1_1, the patches PAT_11 through PAT_1$k$ of the query image IMG_Q1 is encoded to obtain the encoded rows EnCode_11 through EnCode_1$k$ of an intermediate matrix Matrix_IM_1. After the intermediate matrix Matrix_IM_1 is obtained, the intermediate matrix Matrix_IM_1 is stored into the indexed database 138 for subsequent search. Furthermore, the τ bases are modified to obtain the modified bases. For example, in some embodiments, for the position corresponding to the projections PJT_max having the maximum values, their corresponding bases are multiplied by a first adjustment value (e.g., 1+δ), and the other bases (e.g., the remaining bases) are multiplied by a second adjustment value (e.g. 1-δ). In some embodiments, the first adjustment value is between 1 and 2, and the second adjustment value is between 0 and 1.

When the modified bases are selected in a COMPFEX procedure COMPFEX_2, and a first set of weightings W1_2 is obtained. Next, according to the first set of weightings W1_2, the patches PAT_21 through PAT_2$k$ of the query image IMG_Q2 is encoded to obtain the encoded rows EnCode_21 through EnCode_2$k$ of an intermediate matrix Matrix_IM_2. In such embodiments, the query image IMG_Q2 and the query image IMG_Q1 are obtained from the same image. Furthermore, the query image IMG_Q2 is different from the query image IMG_Q1, but the query images IMG_Q1 and IMG_Q2 have the similar features, for example, the query images IMG_Q1 and IMG_Q2 are the different patch sets generated from the same image IMG_Q. After the intermediate matrix Matrix_IM_2 is obtained, the intermediate matrix Matrix_IM_2 is also stored into the indexed database 138 for subsequent search. Furthermore, the modified bases are modified again to obtain the re-modified bases. For example, in some embodiments, for the position corresponding to the projections PJT_max having the maximum values, their corresponding modified bases are multiplied by the first adjustment value (e.g., 1+δ), and the other modified bases (e.g., the remaining bases) are multiplied by the second adjustment value (e.g. 1-δ).

In FIG. 5, the COMPFEX procedures COMPFEX_1 through COMPFEX_n are performed in sequence until the COMPFEX procedure COMPFEX_n is completed. Similarly, according to the first set of weightings W1_n, the patches PAT_n1 through PAT_n$k$ of the query image IMG_Qn is encoded to obtain the encoded rows EnCode_n1 through EnCode_n$k$ of an intermediate matrix Matrix_IM_n. After the COMPFEX procedure COMPFEX_n is completed, an intermediate matrix Matrix_IM_n is obtained, and the intermediate matrix Matrix_IM_n is assigned as the final encoding matrix Matrix_EC.

In the HEBS procedure 134 of FIG. 5, the COMPFEX procedures COMPFEX_1 through COMPFEX_n are performed on multiple sets of patches (stored in the indexed database 138 or from various query images IMG_Q) repeatedly according to various bases, so as to amplify most-used bases/features in the query image IMG_Q to obtain the final encoding matrix Matrix_EC. Furthermore, the bases used in each of the COMPFEX procedures COMPFEX_1 through COMPFEX_n are obtained by modified the previous bases used in the last COMPFEX procedure. In other words, the based used in each of the COMPFEX procedures COMPFEX_1 through COMPFEX_n are modified to obtain the based for the next COMPFEX procedure.

Figure 6:
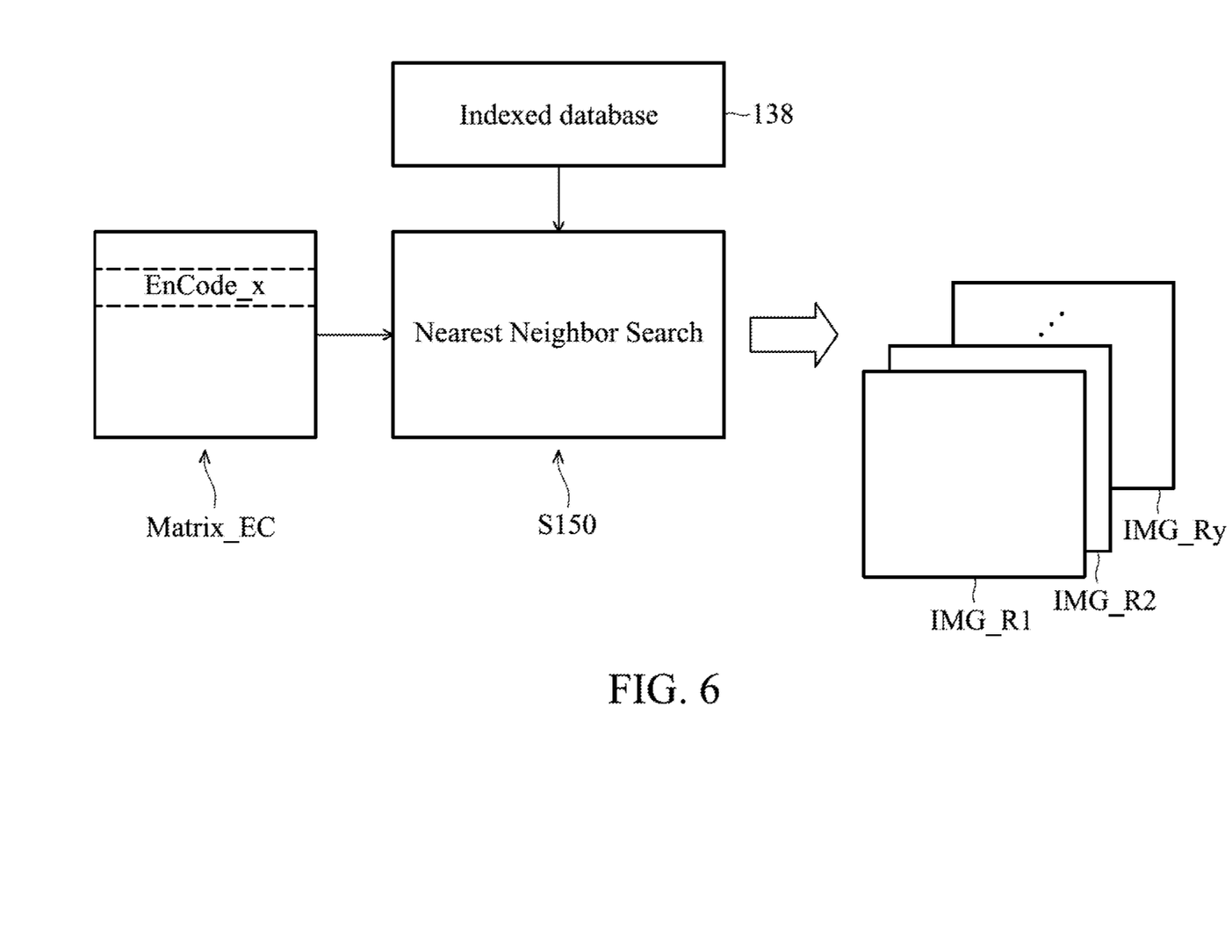
FIG. 6 shows a flowchart of the operations S150 of FIG. 1, in accordance with some embodiments of the disclosure.

FIG. 6 shows a flowchart of the operations S150 of FIG. 1, in accordance with some embodiments of the disclosure. The encoding matrix Matrix_EC is obtained in operation S140 of FIG. 1. As described above, the encoding matrix Matrix_EC is obtained by performing the COMPFEX procedure 132 on the query image IMG_Q. In some embodiments, the encoding matrix Matrix_EC is obtained by further performing the COMPFEX procedures 132 on the query image IMG_Q repeatedly, i.e. the HEBS procedure 134.

In operation S150, a nearest neighbor search procedure is performed on the encoding matrix Matrix_EC with the matrices stored in the indexed database 138. In the nearest neighbor search procedure, multiple images IMG_R1 through IMG_Ry are retrieved from the indexed database 138 based the encoding matrix Matrix_EC. Each of the images IMG_R1 through IMG_Ry includes multiple rows. In some embodiments, the rows of the images IMG_R1 through IMG_Ry are the encoded rows, such as the encoded row EnCode_x in FIG. 4 or the encoded rows EnCode_11 through EnCode_nk in FIG. 5.

In some embodiments, the images IMG_R1 through IMG_Ry have one or more rows similar or equal to the encoded rows of the encoding matrix Matrix_EC. In some embodiments, one of the images IMG_R1 through IMG_Ry has the rows completely equal to the encoded rows of the encoding matrix Matrix_EC.

As described above in FIG. 5, the intermediate matrices Matrix_IM_1 through Matrix_IM_n are stored into the indexed database 138. In some embodiments, the images IMG_R1 through IMG_Ry include one or more intermediate matrices (e.g., Matrix_IM_1 through Matrix_IM_n) obtained in the previous HEBS procedure 134 and/or the COMPFEX procedure 132. In other words, continuous dictionary update (unsupervised training in background) further improves further improves the adaptability to the indexed database 138, i.e., the indexed database 138 is updated dynamically.

Figure 7:
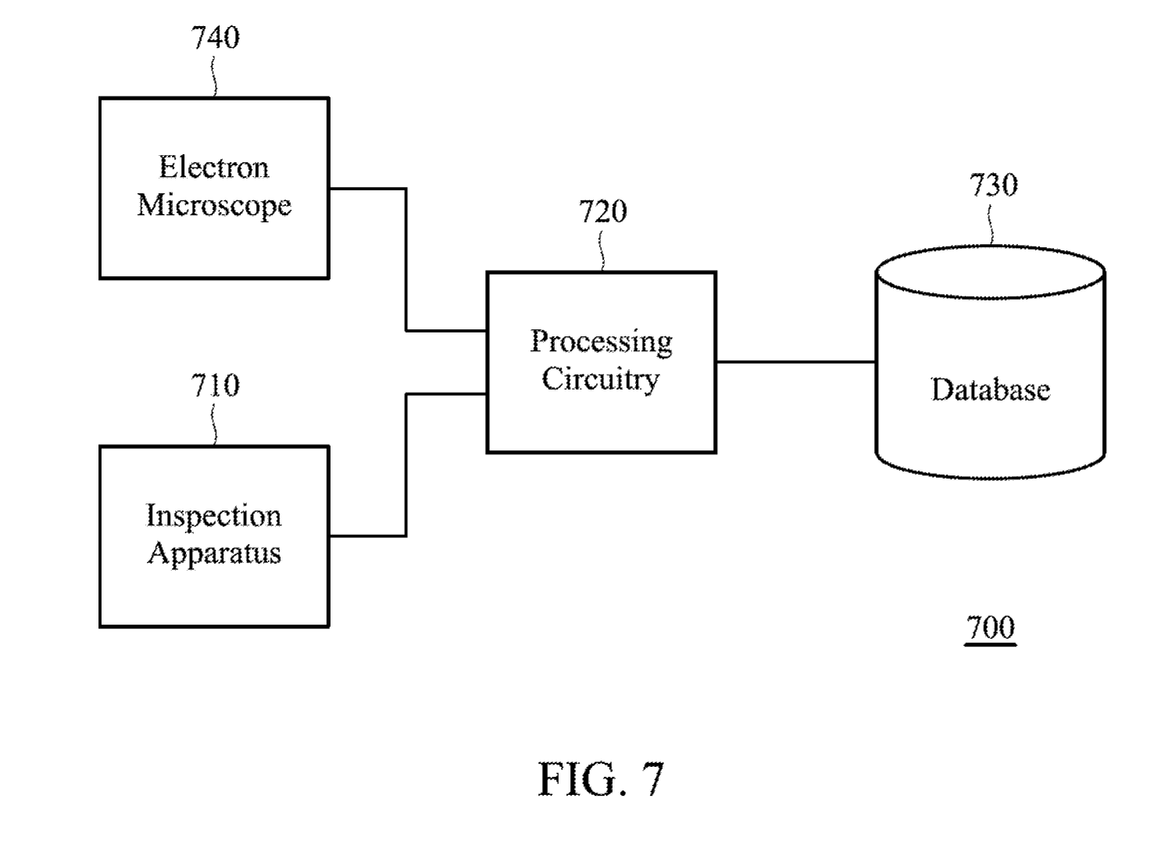
FIG. 7 shows a simplified diagram of a system for inspecting one or more semiconductor wafers according to the method of FIG. 1, in accordance with some embodiments of the disclosure.

FIG. 7 shows a simplified diagram of a system 700 for inspecting one or more semiconductor wafers according to the method of FIG. 1, in accordance with some embodiments of the disclosure. The system 700 includes an inspection apparatus 710, a processing circuitry 720, a database 730, and an electron microscope 740. The processing circuitry 720 is coupled to the inspection apparatus 710, the database 730 and the electron microscope 740.

A plurality of dies are implemented in one or more semiconductor wafers through various processes and stages at a wafer fabrication facility. When each process or stage is performed, the one or more semiconductor wafers will be inspected through the system 700.

The semiconductor wafers to be inspected are loaded in the inspection apparatus 710. When the semiconductor wafers are loaded in the inspection apparatus 710, the inspection apparatus 710 inspects the one or more semiconductor wafers to obtain one or more query images. In some embodiments, the query image may include defect or hotspot in the semiconductor wafer.

According to the query images, the processing circuitry 720 is capable of retrieving similar images from the database 730. In some embodiments, the sparsity-based dictionary 136 and the indexed database 138 described in FIG. 2 are implemented in the database 730. Furthermore, the database 730 is capable of providing off-line update for the sparsity-based dictionary 136 and the indexed database 138. Continuous dictionary update (unsupervised training in background) further improves adaptivity to dynamic database.

In some embodiments, the method of FIG. 1 can benefit from computing-in memory (CiM) by storing the sparsity-based dictionary 136 and the indexed database 138 in a memory of a computer system, then the query image is input to flow through the memory for matrix operations (e.g. multiply-accumulate).

Figure 8:
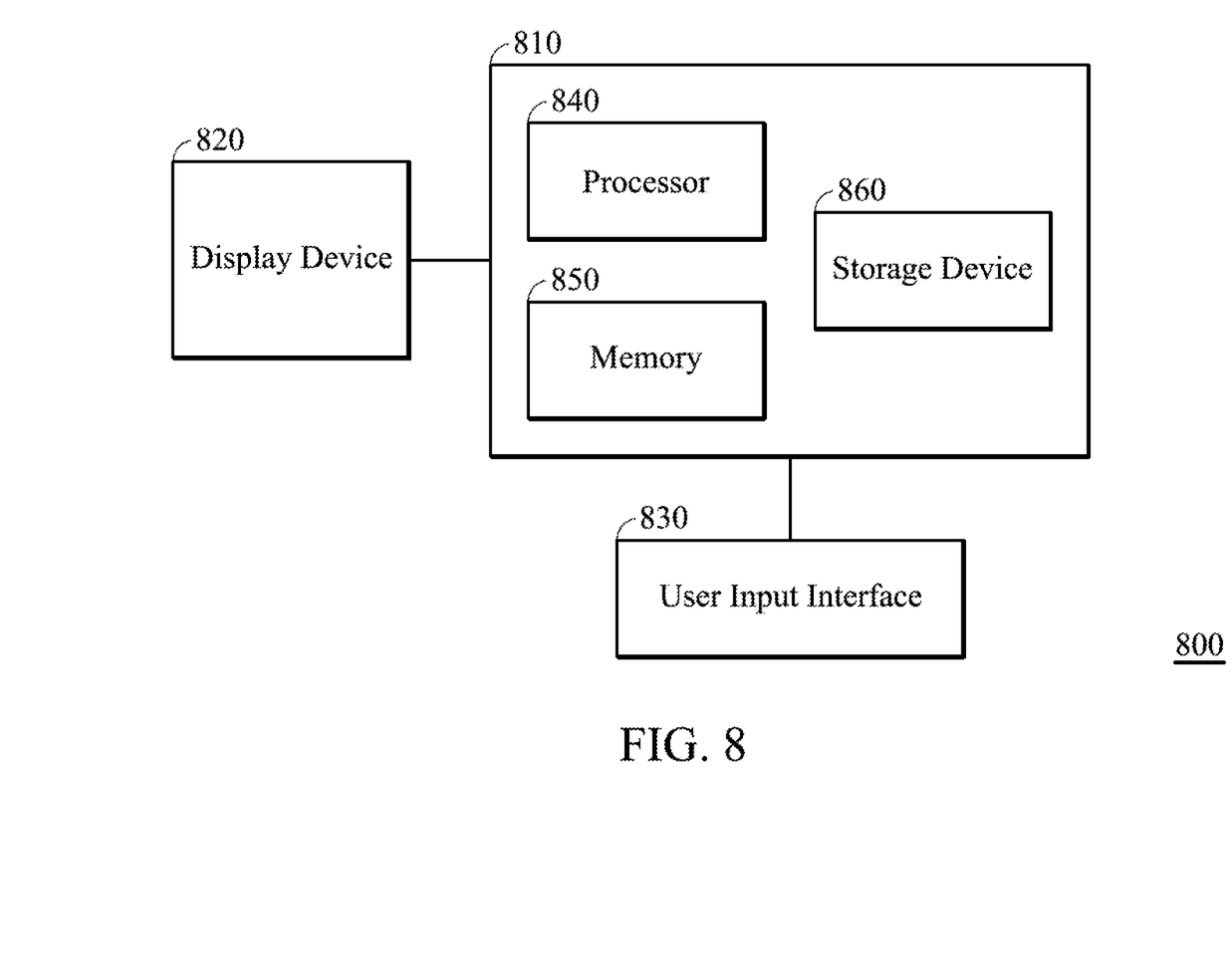
FIG. 8 shows a computer system, in accordance with some embodiments of the disclosure.

FIG. 8 shows a computer system 800, in accordance with some embodiments of the disclosure. The computer system 800 includes a computer 810, a display device 820 and a user input interface 830, wherein the computer 810 includes a processor 840, a memory 850, and a storage device 860. The computer 810 is coupled to the display device 820 and the user input interface 830. Furthermore, the computer 810 is capable of receiving the query image and displaying the query image on the display device 820. In some embodiments, the display device 820 is a GUI for the computer 810. Furthermore, the display device 820 and the user input interface 830 can be implemented in the computer 810. The user input interface 830 may be a keyboard, a mouse and so on. In the computer 810, the storage device 860 can store the operating systems (OSs), applications, and data that include input required by the applications and/or output generated by applications. Furthermore, the sparsity-based dictionary 136 and the indexed database 138 are stored in the memory 850. The processor 840 of the computer 810 can perform one or more operations (either automatically or with user input), in any method that is implicitly or explicitly described in this disclosure. Furthermore, during operation, the processor 840 can load the applications of the storage device 860 into the memory 850, and then the applications can be used by a user to create, view, and/or edit the encoding matrix Matrix_EC.

In some embodiments, the apparatus or manufacture comprising a computer useable or readable medium having control logic (software) stored thereon is also referred to herein as a computer program product or program storage device. This includes, but is not limited to, the computer system 800 and the memory 850, as well as tangible articles of manufacture embodying any combination of the foregoing. Such control logic, when executed by one or more data processing devices (such as computer system 800), causes such data processing devices to operate as described herein.

In some embodiments, the operations of FIGS. 1, 2 and 6, are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The encoding matrix and the intermediate matrices described in this disclosure can be partially or fully stored on a computer-readable storage medium and/or a hardware module and/or hardware apparatus. A computer-readable storage medium may be, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Examples of hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and operations described in this disclosure can be partially or fully embodied as code and/or data stored in a computer-readable storage medium or device, so that when a computer system reads and executes the code and/or data, the computer system performs the associated methods and processes. The methods and operations can also be partially or fully embodied in hardware modules or apparatuses, so that when the hardware modules or apparatuses are activated, they perform the associated methods and processes. Note that the methods and operations can be embodied using a combination of code, data, and hardware modules or apparatuses.

Embodiments of method for retrieving images from an indexed database based on a query image are provided. A highly adaptive and efficient way is used to retrieve perceptually-similar images from a (dynamic) database, given one previously unknown query image. This can automate workload originally done by human inspection. By using the limited-non-zero weightings, the query image is encoded into a set of weightings with features of database as bases, and the number of non-zero terms is limited. Then the set of weightings is used to retrieve most similar images from the indexed database.

In some embodiments, a method for retrieving images from a database is provided. A query image is obtained. A plurality of patches are extracted from the query image. A set of weightings is obtained according to a plurality of bases of a sparsity-based dictionary. The set of weightings includes a plurality of non-zero weightings. The patches are encoded with the set of weightings to obtain an encoding matrix. The database is searched based on the encoding matrix to retrieve the images corresponding to the query image.

In some embodiments, a method for retrieving images from a database is provided. A query image is obtained. The query image is divided into a plurality of row vectors. The row vectors are assigned as a plurality of patches. Each of the row vectors corresponds to an individual patch. Each of the patches is encoded with a set of weightings to obtain an individual row of an encoding matrix. The database is searched based on the encoding matrix to retrieve the images corresponding to the query image. Each of non-zero weightings within the set of weightings has a weighting value equal to or less than 1.

In some embodiments, a non-transitory computer-readable storage medium storing instructions that, when executed by a computer, cause the computer to perform a method for retrieving images from a database, is provided. A query image is obtained. A plurality of patches are extracted from the query image. A set of weightings is obtained according to a plurality of bases of a sparsity-based dictionary. The set of weightings includes a plurality of non-zero weightings. The patches are encoded with the set of weightings to obtain an encoding matrix. The database is searched based on the encoding matrix to retrieve the images corresponding to the query image.

The foregoing outlines nodes of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for processing a semiconductor wafer, comprising:
    obtaining a query image from the semiconductor wafer;
    extracting a plurality of patches from the query image;
    obtaining a set of weightings according to a plurality of bases of a sparsity-based dictionary, wherein the set of weightings includes a plurality of non-zero weightings;
    encoding the patches with the set of weightings to obtain an encoding matrix;
    searching the database based on the encoding matrix to retrieve the images corresponding to the query image, wherein each of the images comprises at least one pattern feature of the semiconductor wafer;
    using the retrieved images to inspect of defects of the semiconductor wafer, so as to generate an inspection result; and
    performing a semiconductor process on the semiconductor wafer when the inspection result is normal;
    wherein extracting the patches from the query image further comprises:
    obtaining a plurality of sets of the patches from the query image, wherein the plurality of sets of the patches comprises a first set of the patches, a second set of the patches and a third set of the patches;
    wherein encoding the patches with the set of weightings to obtain the encoding matrix further comprises:
    encoding the first set of the patches with a first set of weightings to obtain a first intermediate matrix;
    encoding the second set of the patches with a second set of weightings to obtain a second intermediate matrix, wherein the second set of weightings is obtained by modifying the bases of the sparsity-based dictionary according to the first intermediate matrix;
    encoding the third set of the patches with a third set of weightings to obtain a third intermediate matrix, wherein the third set of weightings is obtained by modifying the bases of the sparsity-based dictionary according to the second intermediate matrix; and
    assigning the third intermediate matrix as the encoding matrix.

2. The method as claimed in claim 1, further comprising:
    selecting the bases from the sparsity-based dictionary,
    wherein each of the bases forms a column vector corresponding to an individual column of the query image.

3. The method as claimed in claim 2, wherein extracting the patches from the query image further comprises:
    dividing the query image into a plurality of row vectors, wherein each of the row vectors corresponds to an individual patch.

4. The method as claimed in claim 3, wherein obtaining the set of weightings according to the bases of the sparsity-based dictionary further comprises:
    calculating a plurality of projection values to obtain projections for the row vectors on the column vectors; and
    obtaining the set of weightings according to the projections,
    wherein the projection having a maximum projection value is obtained.

5. The method as claimed in claim 4, wherein obtaining the set of weightings according to the projections further comprises:
    normalizing the non-zero weightings within the set of weightings to a length of 1.

6. The method as claimed in claim 4, further comprising:
    increasing value of the base of the sparsity-based dictionary corresponding to the projection having the maximum projection value; and
    decreasing values of the bases of the sparsity-based dictionary corresponding to the projections without the maximum projection value.

7. The method as claimed in claim 1, wherein each of the non-zero weightings within the set of weightings has a weighting value equal to or less than 1.

8. The method as claimed in claim 1, wherein the patches have the same size.

9. A method for processing a semiconductor wafer, comprising:
    obtaining a query image from the semiconductor wafer;
    dividing the query image into a plurality of row vectors;
    assigning the row vectors as a plurality of patches, wherein each of the row vectors corresponds to an individual patch;
    encoding the patches with a set of weightings to obtain an encoding matrix;
    searching the database based on the encoding matrix to retrieve the images corresponding to the query image, wherein each of the images comprises at least one pattern feature of the semiconductor wafer;
    using the retrieved images to inspect of defects of the semiconductor wafer, so as to generate an inspection result; and
    performing a semiconductor process on the semiconductor wafer when the inspection result is normal,
    wherein each of non-zero weightings within the set of weightings has a weighting value equal to or less than 1;
    wherein the plurality of the patches comprises a first set of the patches, a second set of the patches and a third set of the patches;
    wherein encoding the patches with the set of weightings to obtain the encoding matrix further comprises:
    encoding the first set of the patches with a first set of weightings to obtain a first intermediate matrix;
    encoding the second set of the patches with a second set of weightings to obtain a second intermediate matrix, wherein the second set of weightings is obtained by modifying the bases of the sparsity-based dictionary according to the first intermediate matrix;
    encoding the third set of the patches with a third set of weightings to obtain a third intermediate matrix, wherein the third set of weightings is obtained by modifying the bases of the sparsity-based dictionary according to the second intermediate matrix; and
    assigning the third intermediate matrix as the encoding matrix.

10. The method as claimed in claim 9, further comprising:
    selecting a plurality of bases from a sparsity-based dictionary,
    wherein each of the bases forms a column vector corresponding to an individual column of the query image.

11. The method as claimed in claim 10, further comprising:
obtaining the set of weightings according to the bases of the sparsity-based dictionary;
calculating a plurality of projection values to obtain projections for the row vectors on the column vectors; and
obtaining the set of weightings according to the projections,
wherein the projection having a maximum projection value is obtained.

12. The method as claimed in claim 11, wherein obtaining the set of weightings according to the projections further comprises:
normalizing the non-zero weightings within the set of weightings to a length of 1.

13. The method as claimed in claim 11, further comprising:
increasing value of the base of the sparsity-based dictionary corresponding to the projection having the maximum projection value; and
decreasing values of the bases of the sparsity-based dictionary corresponding to the projections without the maximum projection value.

14. The method as claimed in claim 9, wherein each of the non-zero weightings within the set of weightings has a weighting value of 1.

15. The method as claimed in claim 9, wherein the patches have the same size.

16. A non-transitory computer-readable storage medium storing instructions that, when executed by a computer, cause the computer to perform a method for processing a semiconductor wafer, the method comprising:
obtaining a query image from the semiconductor wafer;
extracting a plurality of patches from the query image;
obtaining a set of weightings according to a plurality of bases of a sparsity-based dictionary, wherein the set of weightings includes a plurality of non-zero weightings;
encoding the patches with the set of weightings to obtain an encoding matrix;
searching the database based on the encoding matrix to retrieve the images corresponding to the query image, wherein each of the images comprises at least one pattern feature of the semiconductor wafer;
using the retrieved images to inspect of defects of the semiconductor wafer, so as to generate an inspection result; and
performing a semiconductor process on the semiconductor wafer when the inspection result is normal;
wherein extracting the patches from the query image further comprises:
obtaining a plurality of sets of the patches from the query image, wherein the plurality of sets of the patches comprises a first set of the patches, a second set of the patches and a third set of the patches;
wherein encoding the patches with the set of weightings to obtain the encoding matrix further comprises:
encoding the first set of the patches with a first set of weightings to obtain a first intermediate matrix;
encoding the second set of the patches with a second set of weightings to obtain a second intermediate matrix, wherein the second set of weightings is obtained by modifying the bases of the sparsity-based dictionary according to the first intermediate matrix;
encoding the third set of the patches with a third set of weightings to obtain a third intermediate matrix, wherein the third set of weightings is obtained by modifying the bases of the sparsity-based dictionary according to the second intermediate matrix; and
assigning the third intermediate matrix as the encoding matrix.

17. The non-transitory computer-readable storage medium as claimed in claim 16, the method further comprising:
selecting the bases from the sparsity-based dictionary, wherein each of the bases forms a column vector corresponding to an individual column of the query image.

18. The non-transitory computer-readable storage medium as claimed in claim 17, wherein extracting the patches from the query image further comprises:
dividing the query image into a plurality of row vectors, wherein each of the row vectors corresponds to an individual patch.

19. The non-transitory computer-readable storage medium as claimed in claim 18, wherein obtaining the set of weightings according to the bases of the sparsity-based dictionary further comprises:
calculating a plurality of projection values to obtain projections for the row vectors on the column vectors; and
obtaining the set of weightings according to the projections,
wherein the projection having a maximum projection value is obtained.

20. The non-transitory computer-readable storage medium as claimed in claim 16, wherein the patches have the same size.

* * * * *